United States Patent [19]

Berisford et al.

[11] 3,728,443

[45] Apr. 17, 1973

[54] PRODUCTION OF HIGH ASPECT RATIO ACICULAR RUTLE $TIO_2$

[75] Inventors: Robert Berisford; Eric P. Joinson, both of Wilmington, Del.

[73] Assignee: E. I. du Pont de Nemours and Company, Wilmington, Del.

[22] Filed: Sept. 14, 1971

[21] Appl. No.: 180,449

[52] U.S. Cl.............423/610, 106/300, 23/301 R
[51] Int. Cl. ......C01g 23/04, C01g 33/08, B01d 9/00
[58] Field of Search .....................23/202 R, 301 R; 106/300; 423/610

[56] References Cited

UNITED STATES PATENTS

| | | | |
|---|---|---|---|
| 3,241,928 | 3/1966 | Pease | 23/305 |
| 3,329,484 | 7/1967 | Long et al. | 23/202 R |
| 3,549,322 | 12/1970 | Klein et al. | 23/202 R |
| 3,579,310 | 5/1971 | Lewis et al. | 23/202 R |
| 3,650,693 | 3/1972 | Borchardt | 23/202 R |

*Primary Examiner*—Edward Stern
*Attorney*—Donald A. Hoes

[57] ABSTRACT

$TiO_2$ fibers are produced in the form of single acicular rutile crystals from a calcined blend of $TiO_2$, salt and oxy-phosphorus components. High aspect ratio fibers are achieved by the use of water in the blend and critical control of the ratios of the solid components.

5 Claims, No Drawings

PRODUCTION OF HIGH ASPECT RATIO ACICULAR RUTLE TIO

BACKGROUND OF THE INVENTION

Lewis et al. U.S. Pat. No. 3,579,310 discloses the production of $TiO_2$ particles in the form of single acicular rutile crystals having an aspect ratio (ratio of length to cross-sectional diameter) of up to 50 by calcining certain $TiO_2$, salt and oxy-phosphorus components at a temperature of at least 725° C. followed by leaching of the soluble salts therefrom. These $TiO_2$ particles, because of their inertness, high strength and low cost are valuable reinforcing agents in a wide variety of plastics, papers, cermets and ceramics.

A preferred process according to the Lewis et al patent, the disclosure of which is specifically incorporated herein by reference, involves the steps of a. calcining in substantially non-flowing solid state at temperatures ranging from about 725° to 900° C. and for periods ranging from about one-half to about 10 hours, a blended mixture of 1. preformed titanium dioxide comprising a seeding amount of rutile titanium dioxide,
  2. a salt selected from the group consisting of sodium chloride and mixtures of at least 50 mol percent sodium chloride with at least one other alkali metal halide or sulfate, and
  3. at least one alkali metal oxy-phosphorus compound as a promoter, the blended mixture containing a ratio of salt to titanium dioxide, by weight, of from about 0.05 to 1 to about 2 to 1, and a ratio of salt to oxy-phosphorus compound, calculated on the phosphorus present, of from about 5:1 to about 130:1, and b. leaching the product from the calcination step to remove soluble salts therefrom, and recovering the desired acicular rutile.

SUMMARY OF THE INVENTION

The present invention relates to the production of acicular rutile particles of the type described in the aforementioned Lewis et al. patent in such a way as to promote the formation of longer crystals, i.e., crystals with aspect ratios that may substantially exceed 50:1. The particles obtained by this invention are thus needle-like in character and of special benefit in applications where a high quality reinforcing agent is needed.

The needle-like, single crystal particles are the result of a calcining/leaching process as described above but operated in such a manner that:

i. water is included in the blended mixture, the amount so employed being 20 to 40 percent based on the weight of solids in the blend,
ii. a high ratio of salt to titanium dioxide is used, specifically a 2:1 to 4.5:1 weight ratio,
iii. a low ratio of salt to oxy-phosphorus compound is used, specifically a 5:1 to 14:1 weight ratio, calculated on the phosphorus present, and
iv. the effective alkali metal/phosphorus molar ratio of the promoter is 2.0 to 2.1.

The term "alkali metal/phosphorus molar ratio" will be referred to herein simply as "M/P ratio" when used generally in connection with various alkali metal salts ($M = Na$, $K$ etc.). The term "Na/P ratio" is thus used herein, for example, in connection with sodium salts. In any case, by the term "effective M/P ratio" is meant the relative quantities of alkali metal and phosphorus in the promoter component (of the $TiO_2$-salt-promoter starting blend) that are available to serve in the generation of rutile crystals and not for neutralization of residual acid or alkali in the starting blend. Thus if a charge of $TiO_2$ and salt is initially brought to substantial neutrality, i.e., to a pH of 7.0, through addition of the alkali metal oxy-phosphorus promoter to give a desired 2.0–2.1 ratio followed by calcination, then the ratio of alkali/phosphorus in the promoter is identical to the effective M/P ratio. Such initial neutrality is not essential, however, for it is entirely practicable to adjust the alkalinity of the promoter to a calculated amount so as to correct for any excess acid or alkali in the other components.

The acicular rutile particles are formed from preformed $TiO_2$ in an oxy-phosphorus-salt melt, the rutile crystal pattern for such growth being set by the presence in the salt melt of a nucleant having the rutile $TiO_2$ crystalline structure and, usually, a particle diameter of substantially the same order of magnitude as the diameter of the acicular rutile product.

The preformed $TiO_2$, comprising a nutrient plus a suitable nucleant or material which will yield a nucleant in the process can, as described in Lewis et al. U.S. Pat. No. 3,579,310, be derived from a wide variety of sources.

If the $TiO_2$ source comprises the hydrolysate of a titanyl sulfate solution, it may contain 7 or 8 percent residual acid even after repeated washings. For use in accordance with the present invention such a $TiO_2$ will preferably be first brought to neutrality, as for example by reaction with dilute sodium hydroxide solution. Thereafter it would be blended in the proper amounts with a salt and a promoter having an M/P ratio of 2.0 to 2.1. But alternatively the same $TiO_2$ could be used without neutralization by increasing to a predetermined amount the alkalinity of the promoter which is to be used in the blend.

Regardless of the source of the rutile seed, it is desirable to keep the amount thereof relatively small, i.e., 0.5 to 2 percent by weight based on the preformed $TiO_2$, in order to assist in lengthening the crystals during the calcining step.

In practically applying the invention, a thoroughly blended mixture, in the form of pellets, if desired, comprising water, preformed $TiO_2$, an alkali metal salt comprising at least 50 mol percent sodium chloride, and an alkali metal oxy-phosphorus compound having a desired M/P ratio, is made up and then is heated to a temperature ranging from 725°–900° C. for a period of one-half to 10 hours. Preferably, heating is effected at temperatures ranging from 800° to 850° C. for a period of from 4 to 6 hours. The water materially assits in creating a compactable solid mass for charging to the calcining furnace. The blend of titania-salt-promotor can be in various proportions, by weight within the following limits: Salt:$TiO_2$ in the range of from 2:1 to 4.5:1; salt:oxy-phosphorus compound, calculated on the basis of phosphorus, in the range of from about 5:1 to about 14:1.

Notwithstanding the presence of the water in the blend, it remains in substantially dry state throughout the heating period, thus permitting a kiln-type operation to be readily undertaken. The titania salt oxyphosphorus compound product which results from the calcination is then cooled and separation and recovery of the acicular rutile pigment component from the water soluble salt mix is brought about by water and acid leaching the calcined product, preferably with accompanying agitation to break up the pellets and dissolve the salts present. Thereafter, the leached product is filtered and dried. The particles of acicular $TiO_2$ pigment are easily separated, and for most applications require only a light grinding treatment to obtain the desired final acicular, single crystal rutile pigment.

In a preferred method, the preformed $TiO_2$ is made up of a blend or mix of separately prepared nutrient and nucleant $TiO_2$ components. The nutrient component comprises finely divided $TiO_2$, in either anatase or rutile crystalline form, such as is recovered from the hydrolysis of a titanium sulfate or chloride solution. The $TiO_2$ is in less stable configuration and more reactive in the salt mix than is the nucleant $TiO_2$ component under the process conditions. The nucleant component comprises any finely divided, rutile crystalline $TiO_2$ having a particle size of less than about 0.2 micron, as determined by electron microscopy. Among useful forms thereof are $TiO_2$ pigments obtained from the calcination of a $TiO_2$ hydrolysate recovered from the hydrolysis of a titanium salt of a monovalent acid, e.g., titanium tetrachloride; or $TiO_2$ recovered from the high temperature oxidation of titanium tetrachloride. The proportion of separately prepared nucleant titanium dioxide to nutrient titanium dioxide is variable but, as indicated above, the former is desirably used in small amounts.

The $TiO_2$ products of this invention are in finely divided, discrete, acicular single crystal rutile form, and have an average cross-sectional dimension ranging from 0.01 to 0.5 micron with usually an aspect ratio in excess of about 25:1 and, frequently, up to 300:1 or more. They are especially useful as a reinforcement for plastics and other materials. For purposes of this invention, discrete, acicular, rutile single cyrstals means acicular rutile crystals whose internal structure exhibits a high degree of perfection, i.e., freedom from faults, but which crystals may be twinned. The term "crystals" means an essentially fully dense solid composed of atoms arranged in an orderly repetitive array bounded by plane surfaces which are the external expression of internal structure.

To a clearer understanding of the invention the following specific examples are given. Parts and percentages are by weight. These examples are merely illustrative and are not to be considered as limiting the underlying principles and scope of the invention.

EXAMPLE 1

The following mixture of dry ingredients was prepared
1. 12.5 grams of micropulverized $Na_2HPO_4$
2. 30.0 grams of micropulverized NaCl
3. 0.1 gram of rutile $TiO_2$ which has been prepared by the high temperature oxidation of $TiCl_4$. Its particle size was predominantly in the 0.1 to 0.25 micron size range.
4. 11.9 grams of a material containing $TiO_2$ in the anatase modification. This was prepared by adding sufficient NaOH (as a 10 percent solution) to the moist filter cake from the conventional hydrolysis of a titaniferous acid sulphate solution until the pH of the slurry was 8.0. This slurry was then dried at 125° C. for 70 hrs.

To this blend of solids was added 16 ml. of distilled water and the mixture "worked or kneaded" until it had a consistency similar to bread dough. The charge was placed on a platinum sheet and calcined in a closed electric furnace for 6 hrs. at 825° C.

The calcines were removed from the furnace, allowed to cool to room temperature and then soaked for an hour in 1,500 ml. of hot distilled water, followed by three washings with 1,500 ml. portions of water. Finally the calcines were soaked overnight in 1,500 ml. of dilute HF solution (3.3 percent); the larger undisintegrated pieces being broken up with a Teflon rod. The material was washed five times by decantation, filtered on a millipore filter, washed three more times and then dried at 120° C.

X-ray and electron diffraction techniques identified the product to be rutile $TiO_2$. Electron micrographs confirmed its highly acicular nature as evidenced by particle lengths ranging from 4 to 28 microns and widths from 0.14 to 0.25 microns. Aspect ratios ranged from 16 to 200.

EXAMPLE 2

A dry blend was prepared consisting of
1. 100 parts of anatase $TiO_2$ as described in the previous example.
2. 1.0 part rutile, the particle size of which was on the order of about 0.07 micron.
3. 310 parts NaCl.
4. 150 parts $Na_2HPO_4$.

The dry powders were well mixed, water added in an amount of 28.9 percent based on solids to make a dough-like consistency and then calcined at 810° C. for six hours. The cooled calcines were crushed to <10 mesh, soaked in boiling water (300 grams/ 5,000 ml.) for 2 hours, the slurry filtered and then the moist solids reslurried in dilute HF (150 ml. of 48 percent HF in 4,000 ml. solution) for 16 hrs. At the end of this period the slurry was filtered, and the solids washed with distilled water. The product was then well dispersed in a very dilute Versene (Tetrasodium salt of ethylene-diamine-tetraacetic acid) solution (0.29 percent solids by volume) and allowed to settle through a vertical distance of 62.5 cm. for 16 hours. The solids which were still in suspension were separated from the heel and then redispersed in dilute Versene solution (0.17 percent solids by volume) and allowed to settle through a distance of 62.5 cm. for a period of 90 hrs. The material remaining in suspension was recovered, flocculated with alum, $Al_2(SO_4)_3 18H_2O$, filtered and dried.

The product, in 25 percent yield, was found to be highly acicular and 100 percent rutile. It was composed of particles whose lengths ranged from 2 to 30 microns and whose diameters were between 0.08–0.10 microns. Aspect ratios varied from 25–300.

The product was incorporated into polyethylene (10 percent by weight) and the physical properties determined as follows:

| | Polyethylene | Polyethylene Reinforced With 10% Acicular Rutile |
|---|---|---|
| Tensile Strength lbs/in² | 3300 | 4690 |

| | | |
|---|---|---|
| Flex Strength lbs/in² | 4500 | 6804 |
| Flex Modulus lbs/in² | 1.5 × 10⁵ | 3.89 × 10⁵ |

What is claimed is:

1. In a method for producing rutile as needle-like discrete, single crystal particles by
   a. calcining in substantially non-flowing solid state at temperatures rangng from about 725° to 900° C. and for periods ranging from about one-half to about 10 hours, a blended mixture of
      1. preformed titanium dioxide comprising a seeding amount of rutile titanium dioxide,
      2. a salt selected from the group consisting of sodium chloride and mixtures of at least 50 mol percent sodium chloride with at least one other alkali metal halide or sulfate, and
      3. at least one alkali metal oxyphosphorus compound as a promoter, and
   (b) leaching the product from the calcination step to remove soluble salts therefrom, and recovering the desired acicular rutile, the improvement, for promoting the formation of high aspect ratio crystals, wherein step (a) is operated in such a manner that:
      i. water is included in the blended mixture, the amount so employed being 20 to 40 percent based on the weight of solids in the blend,
      ii. the ratio of salt to titanium dioxide used is 2:1 to 4.5:1 on a weight basis,
      iii. the ratio of salt to oxy-phosphorus compound is 5:1 to 14:1 on a weight basis, calculated on the phosphorus present, and
      iv. the effective alkali metal/phosphorus molar ratio of the promoter is 2.0 to 2.1.

2. Process according to claim 1 wherein the salt is sodium chloride.

3. Process according to claim 1 wherein the effective alkali metal/phosphorus molar ratio of said promoter is 2.0.

4. Process according to claim 1 wherein said seeding amount is 0.5 to 1 percent, based upon said preformed titanium dioxide.

5. Process according to claim 1 wherein the calcining temperature is 800°– 850° C., and the calcination period is 4 to 6 hours.

* * * * *